United States Patent
Cheng (10) Patent No.: US 10,250,739 B2
(45) Date of Patent: Apr. 2, 2019

(54) TERMINAL EQUIPMENT CONTROL METHOD, TERMINAL EQUIPMENT AND SYSTEM, COMPUTER STORAGE MEDIA

(71) Applicant: ZTE Corporation, Shenzhen, Guangdong (CN)

(72) Inventor: Chong Cheng, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 1 day.

(21) Appl. No.: 15/512,681

(22) PCT Filed: Jan. 23, 2015

(86) PCT No.: PCT/CN2015/071473
§ 371 (c)(1),
(2) Date: Mar. 20, 2017

(87) PCT Pub. No.: WO2016/045284
PCT Pub. Date: Mar. 31, 2016

(65) Prior Publication Data
US 2017/0310818 A1    Oct. 26, 2017

(30) Foreign Application Priority Data
Sep. 24, 2014    (CN) .......................... 2014 1 0494908

(51) Int. Cl.
*H04W 4/02*    (2018.01)
*H04W 4/50*    (2018.01)
(Continued)

(52) U.S. Cl.
CPC ........ *H04M 1/72577* (2013.01); *G06F 21/00* (2013.01); *H04M 1/72552* (2013.01);
(Continued)

(58) Field of Classification Search
CPC ......... H04M 1/72577; H04M 1/72552; H04M 1/72561; H04M 1/72572; H04W 60/00;
(Continued)

(56) References Cited

U.S. PATENT DOCUMENTS

| | | | |
|---|---|---|---|
| 2012/0094262 | A1 | 4/2012 | Brodle |
| 2013/0040629 | A1* | 2/2013 | Sprigg ................. H04W 4/001 455/419 |
| 2013/0260721 | A1* | 10/2013 | Carney .................. H04L 63/10 455/411 |

FOREIGN PATENT DOCUMENTS

| | | |
|---|---|---|
| CN | 101674525 A | 3/2010 |
| CN | 103167499 A | 6/2013 |

(Continued)

OTHER PUBLICATIONS

International Search Report in international application No. PCT/CN2015/071473, dated Jul. 1, 2015, 3 pgs.

(Continued)

*Primary Examiner* — Nam T Huynh
(74) *Attorney, Agent, or Firm* — Cooper Legal Group, LLC (57) ABSTRACT

At least one embodiment of the disclosure discloses a terminal device control method, terminal device, a system and a computer storage medium. The method includes: control strategies for the terminal device and information on current scenario where the terminal device is located are acquired; control information used in controlling the terminal device, is acquired according to the control strategies for the terminal device and the information on the scenario; and the terminal device is controlled according to the control information.

17 Claims, 7 Drawing Sheets

(51) Int. Cl.
  *G06F 21/00* (2013.01)
  *H04W 60/00* (2009.01)
  *H04M 1/725* (2006.01)

(52) U.S. Cl.
  CPC ... *H04M 1/72561* (2013.01); *H04M 1/72572* (2013.01); *H04W 4/02* (2013.01); *H04W 4/50* (2018.02); *H04W 60/00* (2013.01); *H04M 1/72566* (2013.01)

(58) Field of Classification Search
  CPC ....... H04W 4/02; H04W 4/021; H04W 4/029; H04W 52/0264; H04W 4/025; G09B 19/00; G09B 5/00; G09B 5/06
  See application file for complete search history.

(56) References Cited

FOREIGN PATENT DOCUMENTS

| | | |
|---|---|---|
| CN | 103338350 A | 10/2013 |
| CN | 103533128 A | 1/2014 |
| CN | 103745340 A | 4/2014 |
| CN | 103927475 A | 7/2014 |
| CN | 104010073 A | 8/2014 |
| CN | 104023131 A | 9/2014 |
| KR | 20140060793 A | 5/2014 |

OTHER PUBLICATIONS

English Translation of the Written Opinion of the International Search Authority in international application No. PCT/CN2015/071473, dated Jul. 1, 2015, 6 pgs.

* cited by examiner

TERMINAL EQUIPMENT CONTROL METHOD, TERMINAL EQUIPMENT AND SYSTEM, COMPUTER STORAGE MEDIA

TECHNICAL FIELD

The disclosure relates to the field of terminal device control, and more particularly, to a method, a terminal device, a system and computer storage medium for controlling a terminal device.

BACKGROUND

There is an intelligent Agent (AGT) on an intelligent mobile phone of a student. A parent can control time for which the student plays an Application (APP), and control Internet access behaviours of the student and the like through the intelligent AGT.

Technically speaking, parents will manually make configurations on mobile phones of students according to living habits of the students, including configurations about accessible APPs of the mobile phones, time for which the APPs may be played and inaccessible APPs. The configurations are made once before the students go to school; the configurations are made once after the students come home from school; and configurations are also frequently made at weekends according to switching of activity scenarios.

Such a supervision manner has the following shortcomings: 1) the parents are required to get the mobile phones of the students every time when the parents intend to make configurations on the mobile phones of the students; 2) in case where some special scenarios occur to the students on campus, the parents cannot timely modify the configurations to be adapted to the new scenarios and issue new supervision strategies; 3) contents of the configurations are one-time, and are also undiversified, which causes that intelligent AGTs on the mobile phones of the students cannot automatically perform switching and issue different supervision strategies according to changes of activity scenarios of the students; and 4) the parents cannot timely perform track and obtain feedbacks such that the parents cannot determine whether to regulate corresponding strategies.

In a word, an existing solution for controlling intelligent mobile phones of students is inflexible in implementation, low in control accuracy and unfavourable for user experiences.

SUMMARY

In view of this, for solving the existing technical problems, at least one embodiment of the disclosure provides the following solutions.

At least one embodiment of the disclosure provides a terminal device control method, which is applied to a terminal device to be controlled. The method includes: control strategies for the terminal device and information on current scenario where the terminal device is located are acquired; control information used in controlling the terminal device is acquired according to the control strategies for the terminal device and the information on the scenario; and the terminal device is controlled according to the control information.

In an embodiment of the disclosure, the method may further include: operating information of the terminal device is recorded; and the operating information is sent to a preset master control terminal device, in response to request information or regularly.

In an embodiment of the disclosure, the method may further include: control strategy regulation information is acquired; control information used in controlling the terminal device is acquired according to the control strategy regulation information and information on the current scenario; and the terminal device is controlled according to the control information.

In an embodiment of the disclosure, the method may further include: a request for regulating the control strategies is sent.

In an embodiment of the disclosure, the method may further include: the terminal device to be controlled is bound to the master control terminal device.

In an embodiment of the disclosure, the terminal device to be controlled may be bound to the master control terminal device in any one of: a short message verification code manner, a two-dimensional code scanning manner and a manner that the terminal device to be controlled actively performs registration.

At least one embodiment of the disclosure further provides a terminal device control method, which is applied to a master control terminal device. The method includes: configuration information related to a control scenario is acquired; control strategies are determined according to the configuration information; and the control strategies are sent to a terminal device to be controlled.

In an embodiment of the disclosure, the configuration information may include one or more of: position information and course table information; and the control strategies may include one or more of: whether an APP is allowed to run, a time period for which the APP is allowed to run, whether a website is allowed to be accessed and whether to lock a screen.

In an embodiment of the disclosure, the method may further include: the terminal device to be controlled is bound to the master control terminal device.

In an embodiment of the disclosure, the terminal device to be controlled may be bound to the master control terminal device in any one of: a short message verification code manner, a two-dimensional code scanning manner and a manner that the terminal device to be controlled actively performs registration.

The embodiments of the disclosure further disclose a terminal device, which is a terminal device to be controlled. The terminal device includes a first acquisition module, a second acquisition module, a third acquisition module and an execution module.

The first acquisition module may be arranged to acquire control strategies for the terminal device.

The second acquisition module may be arranged to acquire information on current scenario where the terminal device is located.

The third acquisition module may be arranged to acquire control information used in controlling the terminal device, according to the control strategies for the terminal device and the information on the scenario.

The execution module may be arranged to control the terminal device according to the control information.

In an embodiment of the disclosure, the terminal device may further include a recording module and a first sending module.

The recording module may be arranged to record operating information of the terminal device.

The first sending module may be arranged to send the operating information to a preset master control terminal device, in response to request information or regularly.

In an embodiment of the disclosure, the first acquisition module may further be arranged to acquire control strategy regulation information.

The third acquisition module may further be arranged to acquire control information used in controlling the terminal device, according to the control strategy regulation information and information on the current scenario.

In an embodiment of the disclosure, the terminal device may further include a second sending module.

The second sending module may be arranged to send a request for regulating the control strategies.

In an embodiment of the disclosure, the terminal device may further include a first binding processing module.

The first binding processing module may be arranged to perform binding processing to implement binding of the terminal device to be controlled to the master control terminal device.

The embodiments of the disclosure further disclose a terminal device, which may be a master control terminal device. The terminal device includes a fourth acquisition module, a control strategy determination module and a third sending module.

The fourth acquisition module may be arranged to acquire configuration information related to a control scenario.

The control strategy determination module may be arranged to determine control strategies according to the configuration information.

The third sending module may be arranged to send the control strategies to a terminal device to be controlled.

In an embodiment of the disclosure, the terminal device may further include a second binding processing module.

The second binding processing module may be arranged to perform binding processing to implement binding of the terminal device to be controlled to the master control terminal device.

At least one embodiment of the disclosure further provides a system for controlling a terminal device. The system includes a terminal device to be controlled, a network-side device and a master control terminal device.

The terminal device to be controlled is the abovementioned terminal device to be controlled.

The network-side device is arranged to implement communication between the terminal device to be controlled and the master control terminal device.

The master control terminal device is the abovementioned master control terminal device.

The embodiments of the disclosure further provide a computer storage medium having stored thereon computer-executable instructions for executing the abovementioned method.

According to the terminal device control method, terminal device, system and computer storage medium of the embodiments of the disclosure, the control strategies for the terminal device and the information on current scenario where the terminal device is located are acquired; the control information used in controlling the terminal device is acquired according to the control strategies for the terminal device and the information on the scenario; and the terminal device is controlled according to the control information. According to the solutions of the embodiments of the disclosure, the shortcomings of frequent manual configuration of a parent, incapability in forming of a configuration closed loop, inaccurate matching between a configuration and a supervision scenario and the like may be avoided, and flexibility, high control accuracy and good user experiences are achieved.

DETAILED DESCRIPTION

Figure 1:
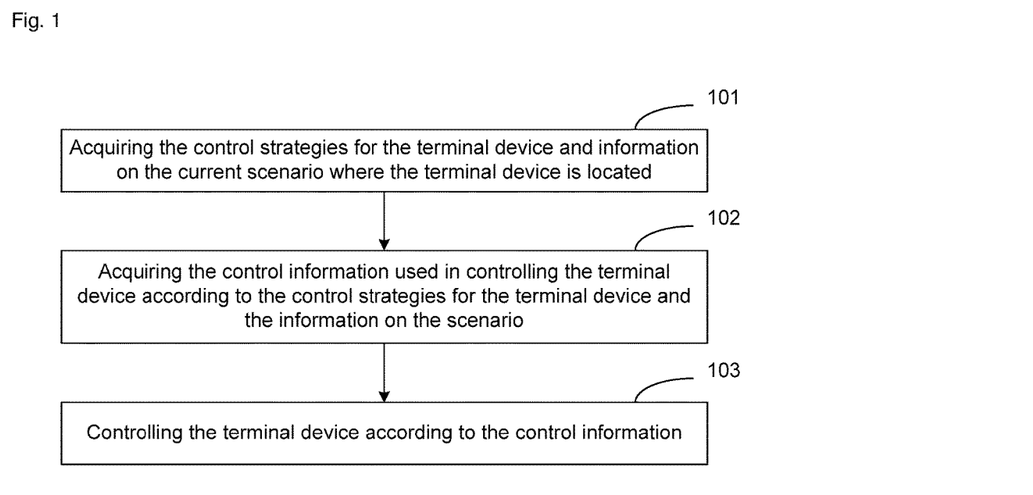
FIG. 1 is a flowchart showing a terminal device control method applied to a terminal device to be controlled according to an embodiment of the disclosure.

At least one embodiment of the disclosure provides a terminal device control method, which is applied to a terminal device to be controlled. As shown in FIG. 1, the method includes steps 101-103.

In the step 101, the control strategies for the terminal device and the information on current scenario where the terminal device is located are acquired.

In the step 102: the control information used in controlling the terminal device, is acquired according to the control strategies for the terminal device and the information on the scenario.

In the step 103, the terminal device is controlled according to the control information.

In an embodiment of the disclosure, the method further includes: operating information of the terminal device is recorded; and the operating information is sent to a preset master control terminal device, in response to request information or regularly.

In an embodiment of the disclosure, the method further includes: control strategy regulation information is acquired; the control information used in controlling the terminal device is acquired according to the control strategy regulation information and information on the current scenario; and the terminal device is controlled according to the control information.

In an embodiment of the disclosure, the method further includes: a request for regulating the control strategies is sent.

In an embodiment of the disclosure, the method further includes: the terminal device to be controlled is bound to the master control terminal device.

In an embodiment of the disclosure, the terminal device to be controlled is bound to the master control terminal device in any one of a short message verification code manner, a two-dimensional code scanning manner and a manner that the terminal device to be controlled actively performs registration.

Figure 2:
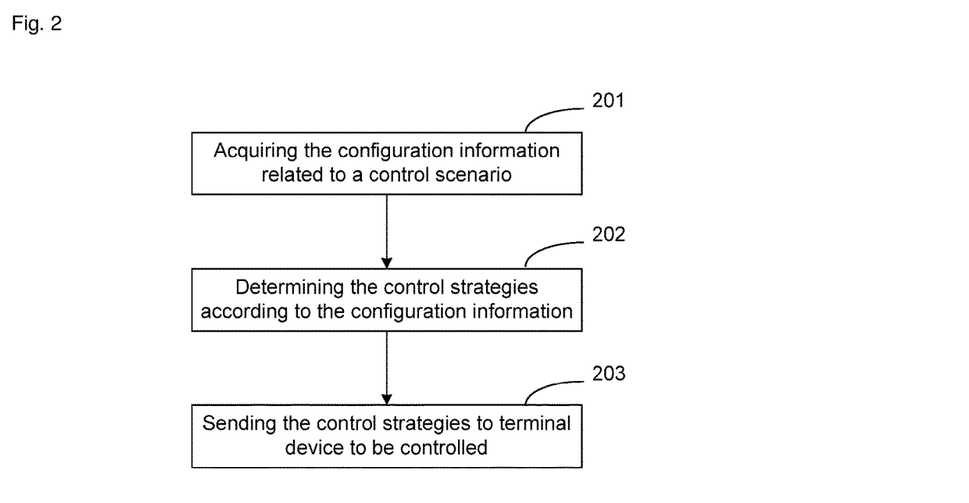
FIG. 2 is a flowchart showing a terminal device control method applied to a master control terminal device according to an embodiment of the disclosure.

At least one embodiment of the disclosure further correspondingly provides a terminal device control method, which is applied to a master control terminal device. As shown in FIG. 2, the method includes steps 201-203.

In the step 201, configuration information related to a control scenario is acquired.

In the step 202, control strategies are determined according to the configuration information.

In the step 203: the control strategies are sent to the terminal device to be controlled.

In an embodiment of the disclosure, the configuration information includes one or more of position information and course table information.

In the embodiment of the disclosure, the control strategies include one or more of: whether an APP is allowed to run, a time period for which the APP is allowed to run, whether a website is allowed to be accessed and whether to lock a screen.

In an embodiment of the disclosure, the method further includes: the terminal device to be controlled is bound to the master control terminal device.

In an embodiment of the disclosure, the terminal device to be controlled is bound to the master control terminal device in any one of a short message verification code manner, a two-dimensional code scanning manner and a manner that the terminal device to be controlled actively performs registration.

Figure 3:
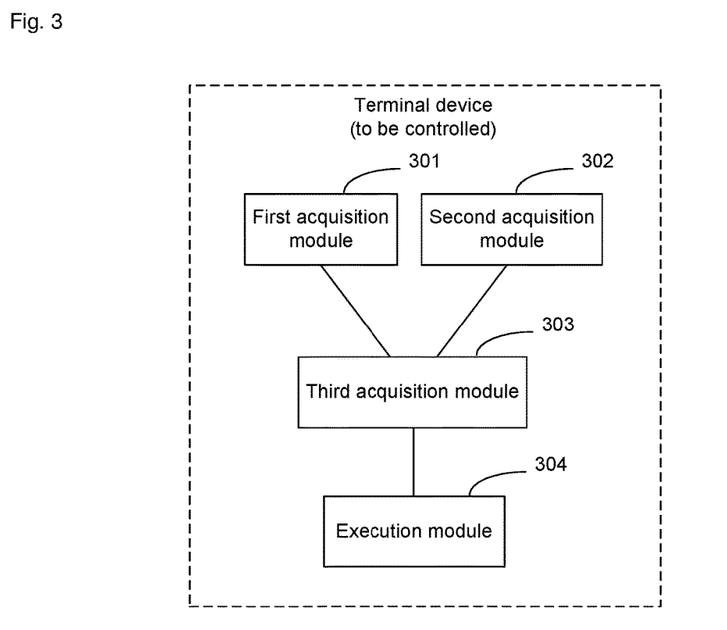
FIG. 3 is a diagram illustrating a structure of terminal device to be controlled according to an embodiment of the disclosure.

Accordingly, at least one embodiment of the disclosure further provides a terminal device, which is a terminal device to be controlled. As shown in FIG. 3, the terminal includes a first acquisition module 301, a second acquisition module 302, a third acquisition module 303 and an execution module 304.

The first acquisition module 301 is arranged to acquire the control strategies for the terminal device.

The second acquisition module 302 is arranged to acquire the information on current scenario where the terminal device is located.

The third acquisition module 303 is arranged to acquire the control information used in controlling the terminal device, according to the control strategies for the terminal device and the information on the scenario.

The execution module 304 is arranged to control the terminal device according to the control information.

Figure 4:
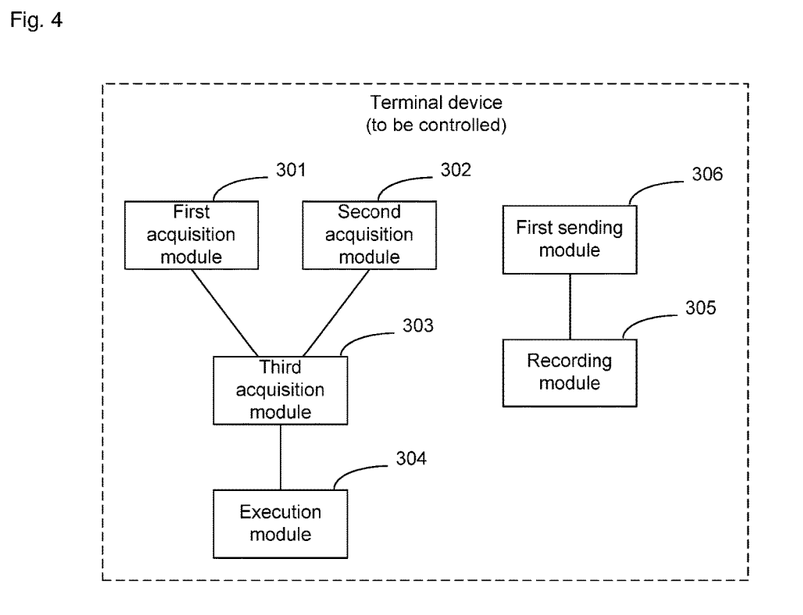
FIG. 4 is a diagram illustrating a structure of another terminal device to be controlled according to an embodiment of the disclosure.

In an embodiment of the disclosure, as shown in FIG. 4, the terminal device further includes a recording module 305 and a first sending module 306.

The recording module 305 is arranged to record the operating information of the terminal device.

The first sending module 306 is arranged to send the operating information to a preset master control terminal device, in response to request information or regularly.

In an embodiment of the disclosure, the first acquisition module 301 is further arranged to acquire control strategy regulation information.

The third acquisition module 303 is further arranged to acquire control information used in controlling the terminal device, according to the control strategy regulation information and information on the current scenario.

Figure 5:
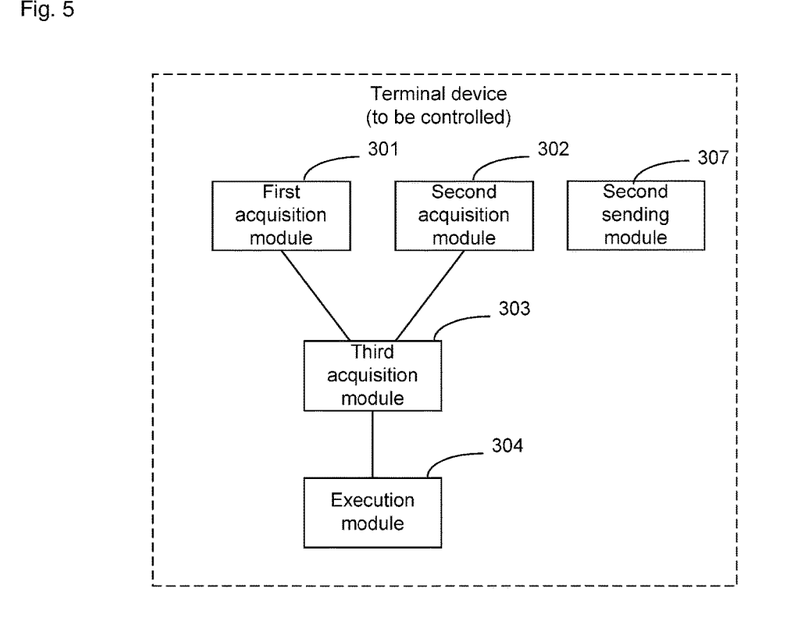
FIG. 5 is a diagram illustrating a structure of another terminal device to be controlled according to an embodiment of the disclosure.

In an embodiment of the disclosure, as shown in FIG. 5, the terminal device further includes a second sending module 307.

The second sending module 307 is arranged to send a request for regulating the control strategies.

Figure 6:
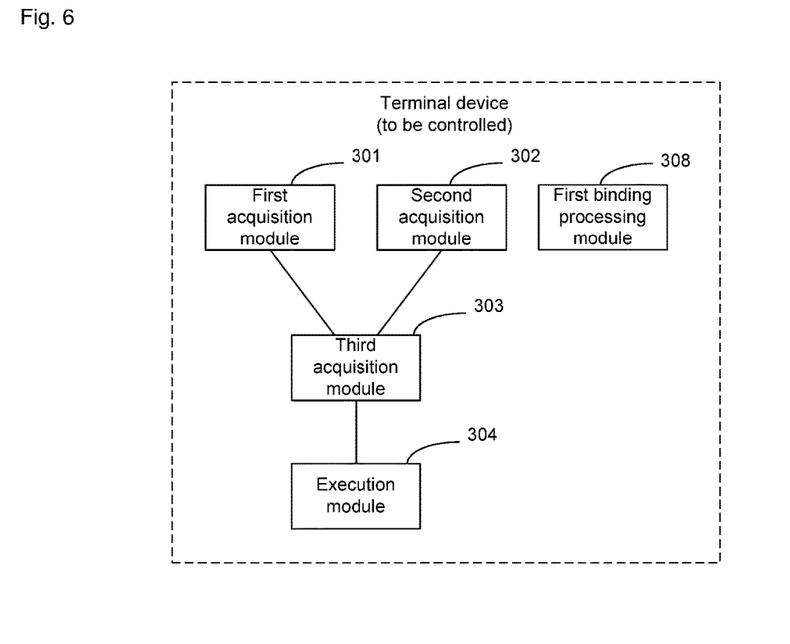
FIG. 6 is a diagram illustrating a structure of another terminal device to be controlled according to an embodiment of the disclosure.

In an embodiment of the disclosure, as shown in FIG. 6, the terminal device further includes a first binding processing module 308.

The first binding processing module 308 is arranged to perform binding processing to implement binding of the terminal device to be controlled with the master control terminal device.

Figure 7:
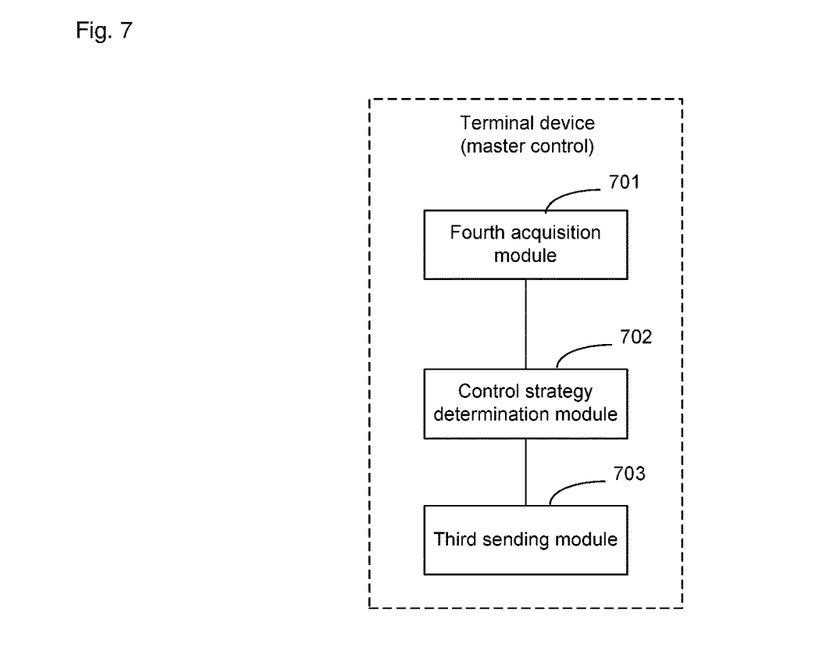
FIG. 7 is a diagram illustrating a structure of a master control terminal device according to an embodiment of the disclosure.

Accordingly, at least one embodiment of the disclosure further correspondingly provides a terminal device, which is a master control terminal device. As shown in FIG. 7, the terminal device includes a fourth acquisition module 701, a control strategy determination module 702 and a third sending module 703.

The fourth acquisition module 701 is arranged to acquire configuration information related to a control scenario.

The control strategy determination module 702 is arranged to determine control strategies according to the configuration information.

The third sending module 703 is arranged to send the control strategies to a terminal device to be controlled.

Figure 8:
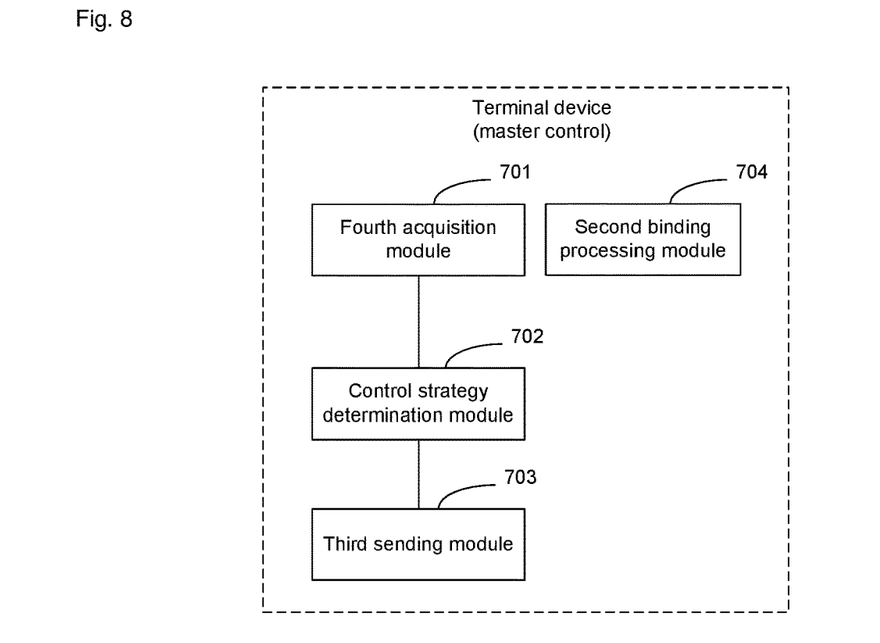
FIG. 8 is a diagram illustrating a structure of another master control terminal device according to an embodiment of the disclosure.

In an embodiment of the disclosure, as shown in FIG. 8, the terminal device further includes a second binding processing module 704.

The second binding processing module 704 is arranged to perform binding processing to implement binding of the terminal device to be controlled to the master control terminal device.

Accordingly, at least one embodiment of the disclosure further provides a system for controlling a terminal device. The system includes: a terminal device to be controlled, a network-side device and a master control terminal device.

The terminal device to be controlled is the terminal device to be controlled shown in any one of FIGS. 3 to 6.

The network-side device is arranged to implement communication between the terminal device to be controlled and the master control terminal device.

The master control terminal device is the master control terminal device shown in FIG. 7 or FIG. 8.

At least one embodiment of the disclosure further provides a computer storage medium having stored thereon computer-executable instructions for executing the method of any of the abovementioned method embodiments.

According to the above descriptions, at least one embodiment of the disclosure can at least implement independent control by the side of the parent, and can set and issue a supervision strategy in real time. A variety of configuration information such as a position and time is provided to adaptively issue various supervision strategies. A feedback closed loop can be formed, and the supervision strategies can be continuously optimized and regulated.

The technical solutions of the disclosure will be further described below with specific embodiments in detail.

First Embodiment

The technical problem to be solved by the embodiment is to: adaptively identify various scenario modes for an intelligent mobile phone of a student, and supervise, by using an intelligent desktop control algorithm and the like, excessive use of the mobile phone of the student for entertainment, thereby overcoming the shortcomings of frequent manual configuration performed by a parent, incapability in forming of a configuration closed loop, inaccurate matching between a configuration and a supervision scenario and the like.

The technical solution of the embodiment is implemented as follows.

On the side of the master control terminal device (which is not on the intelligent mobile phone of the student, and may be on an intelligent mobile phone of the parent), the steps 1-5 are performed.

In the step 1, a fourth acquisition module acquires configuration information (personalized configuration data of the student, mobile phone supervision strategy configuration information and the like) related to a control scenario.

In the embodiment, the fourth acquisition module is positioned in an APP of the parent side, and the parent will set personalized configuration data according to study and living scenarios of the primary/secondary student, and stores the set configuration data on network-side device.

Figure 9:
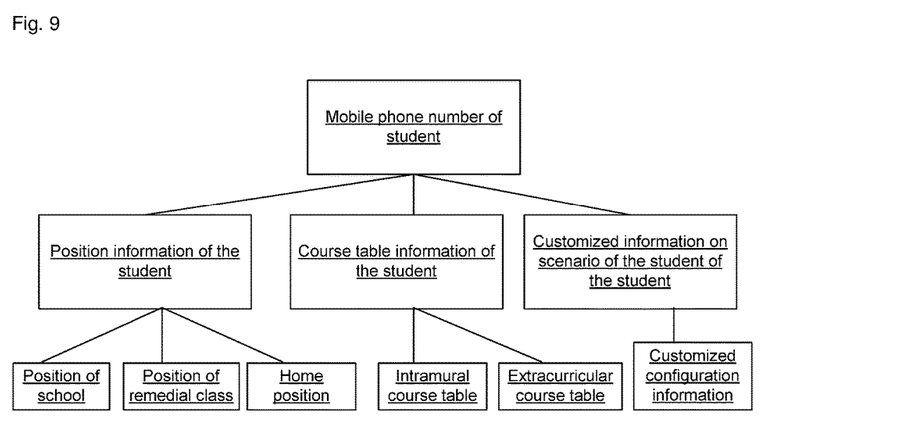
FIG. 9 is a schematic diagram of personalized configuration data of a student according to a first embodiment of the disclosure.

The personalized configuration data of the student, as shown in FIG. 9, may include the following information 1)-4).

1) Basic attribute information of the student

The information may include a mobile phone number (after binding, an device number of the mobile phone of the student may be determined as a unique identity), a nickname, a familiarity number and the like.

2) Position information of the student

Information will be set, including the position information of the school of the student, the position information of the home of the student, the position information of the extracurricular classes of the student, some other main recreation and sports position information and the like. The position information may be in form of house number, latitude and longitude and the like.

3) Course table information of the student

The course table information of the student includes intramural course table information of the student, extracurricular course table information of the student and the like, for example, time distribution of study and recreations of every 24 hours from Mondays to Sundays, such as time table information of class time from 8:00 AM to 9:00 AM, break time from 9:00 AM to 9:10 AM, quitting time at 12:00, class time starting from 14:00 PM, and the like.

4) Customized scenario configuration information

In the step 2, control strategies determination module determines control strategies according to the configuration information.

Here, the control strategies may include the following information 1)-3).

1) APP classification information

The APP classification information includes the attributes of all APPs in the mobile phone, including conventional, recreation, forbidden and the like.

2) Blacklist and whitelist information on the internet access of the mobile phone The blacklist and whitelist information includes information on which websites have restrictions on access the like.

3) Control information in different mode strategies,

The control information includes time for which recreational APPs are used, whether to lock a screen and the like.

For example, in a class time mode strategy, screen locking of the mobile phone, muting, forbidding of the APPs besides some specified APPs such as photographing and the like will be set.

For another example, in a school mode strategy, a certain type of conventional APPs is allowed to be used, and the position information may be regularly fed back to a server. In addition, supervisions of Internet access and the like as bad behaviours are performed.

In the step 3, a third sending module sends the control strategies to a network-side device.

Specifically, the control strategy determination module may issue the control strategies to a bottom-layer communication module. The bottom-layer communication module may upload the control strategies to the network-side device. The bottom-layer communication module is kept in connection with the intelligent mobile phone of the student all the time through an Extensible Messaging and Presence Protocol (EMPP) or another communication protocol, and sends the control strategies to the mobile phone of the student.

On the side of the terminal device to be controlled, the following steps 4-5 are performed.

In the step 4, a first acquisition module acquires the control strategies from the network-side device in real time.

In the step 5, a second acquisition module performs calculations according to a course table and some geographical position information which is the information on current scenario where the terminal device is located.

Figure 10:
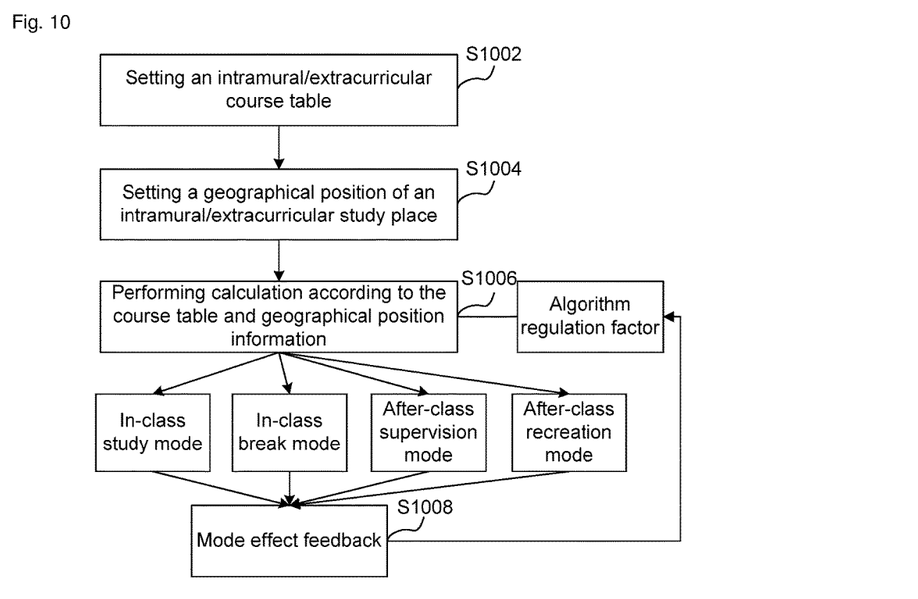
FIG. 10 is a schematic diagram of an algorithm for identifying different scenario modes of primary and secondary students according to a first embodiment of the disclosure.

FIG. 10 is a schematic diagram of an algorithm for identifying different scenario modes of primary and secondary students according to the embodiment. As shown in FIG. 10, a parent sets an intramural course table and an extracurricular course table according to intramural and extracurricular class conditions of a student in a current term. The course tables include time periods (for example, 8:00-9:00) for classes of the student from Mondays to Sundays.

After the course tables of the term are set, the parent will set position information of classes of the student in the current term (In addition to a position of a school, the parent will set position information of extracurricular remedial classes attended at ordinary times). After setting is completed, an intelligent AGT module of a mobile phone of the student calculates a current study scenario mode (which may include: an in-class study mode, an in-class break mode, an after-class supervision mode and an after-class recreation mode) according to set configuration information and current identified time and position of the student. The intelligent AGT module of a mobile phone of the student issues a supervision rule according to the scenario mode, and performs supervision control on the mobile phone of the student.

The student may also return a feedback to the parent according to some special scenarios (intramural and extracurricular), such that the parent can perform configuration information regulation, thereby regulating a study scenario mode of the student.

In addition, the parent and the student may also adaptively regulate the configuration information according to different scenario modes, to improve scenario mode identification accuracy.

For example, automatic switching from the "in-class study" mode to "in-class break" mode and changing of a supervision strategy include: when the mobile phone detects it is currently on campus and the time is just switched from a class time period to a quitting time period, the intelligent AGT module identifies that the "in-class break mode" prearranged by the parent is to be adopted, and issues a corresponding supervision strategy to a desktop control module of the mobile phone; and the desktop control module of the mobile phone executes corresponding operations such as unlocking, limited creation of an APP, incoming call receiving enabling of the mobile phone and the like.

For example, automatic switching from the "in-class break" mode to "after-class supervision" mode and changing of the supervision strategy include: when the intelligent AGT module of the mobile phone detects that the student leaves the campus and the time just switched to a non-study time period, the intelligent AGT module identifies that the "after-class supervision mode" pre-arranged by the parent is to be adopted, and issues a corresponding supervision strategy to the desktop control module of the mobile phone; and the desktop control module of the mobile phone executes corresponding operations such as real-time positioning, filtered and limited Internet access and the like.

In the step 6, a third acquisition module acquires control information used in controlling the terminal device, according to the control strategies for the terminal device and the information on the scenario.

In the step 7, an execution module controls the terminal device according to the control information.

For example, the execution module customizes and draws a screen locking interface for a class mode, and triggers the screen locking interface, and performs limited recreation of the APPs in an after-school mode, supervision on Internet access information and the like. Moreover, the execution module records and timely feeds back the using behaviour habit of the student to the parent, after the mode strategy is issued.

The execution module will ensure that the intelligent mobile phone of the student can be timely and reliably accessed by the parent as much as possible when there is a smooth physical connection. For example, the parent may execute operations of one-key screen locking, real-time positioning and the like under some unconventional conditions.

The network-side device is responsible for keeping some configuration information of the student and the student for a long time. The network-side device can store the configuration information of the parent in the network side and synchronizing the configuration information of the parent to the student side in real time. The network-side device can also record some position information, Internet access behaviours and the like of the student in a network side which can make analytical statistics and return a feedback to the parent.

It is to be noted that the master control terminal device and the terminal device to be controlled may also be the same terminal device. In the embodiment, the descriptions are mainly made with the condition that the master control terminal device and the terminal device to be controlled are different terminal devices.

Second Embodiment

Figure 11:
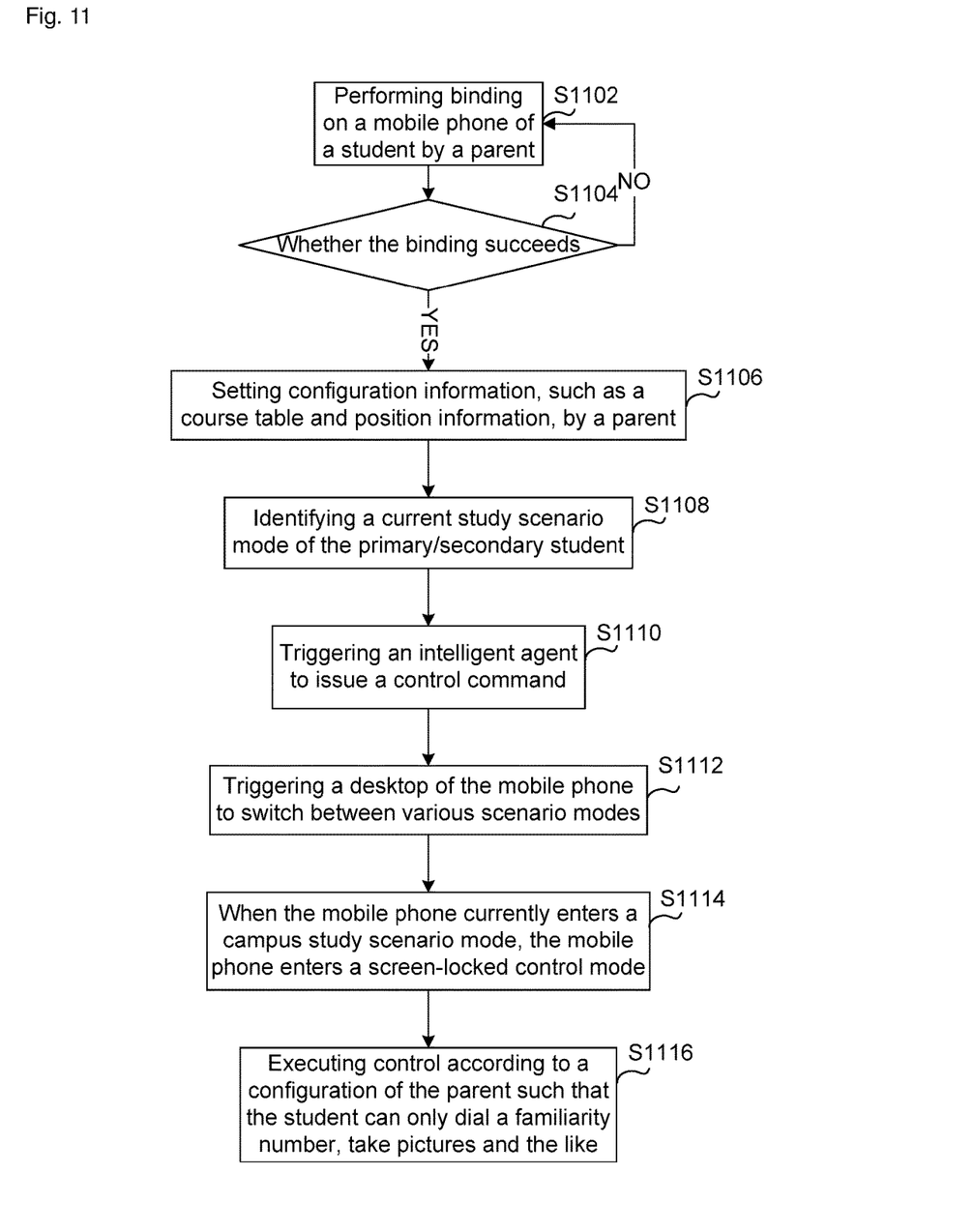
FIG. 11 is a schematic diagram of a typical scenario in which a mobile phone of a student is supervised by a parent according to a second embodiment of the disclosure.

FIG. 11 is a schematic diagram of a typical scenario in which a mobile phone of a student is supervised by a parent. As shown in FIG. 11, a flow includes the following steps.

At first, a parent completes binding of the mobile phone of the parent to the mobile phone of a student through a binding operation in a short message verification code manner (which may also be a manner of two-dimensional code scanning, automatic registration of the mobile phone of the student and the like).

After successful binding, the parent side sets intramural and extracurricular course tables, intramural and extracurricular geographical position information and some other configuration information through a configuration module in a manner of importing, recording and the like.

The configuration information is stored in a server through a Hyper Text Transfer Protocol (HTTP), and notifies the mobile phone of the student for caching through an XMPP.

An AGT module of the intelligent mobile phone of the student dynamically identifies current time and position of the mobile phone of the student, and dynamically calculates a current study scenario mode (an in-class study mode, a break mode and the like) of the intelligent mobile phone of the student according to the cached configuration information.

The intelligent AGT module of the mobile phone of the student issues a series of desktop control commands to a desktop control module according to the identified study scenario mode. The desktop control module may execute supervision control according to the series of desktop control command. For example, when the student is in a class, the intelligent mobile phone is in a screen-locked mode. In the screen-locked mode, all incoming calls and short messages are set to be mute, while the student can execute conventional in-class operations such as checking the time and the weather, dialling a familiarity number of the parent and taking pictures.

Figure 12:
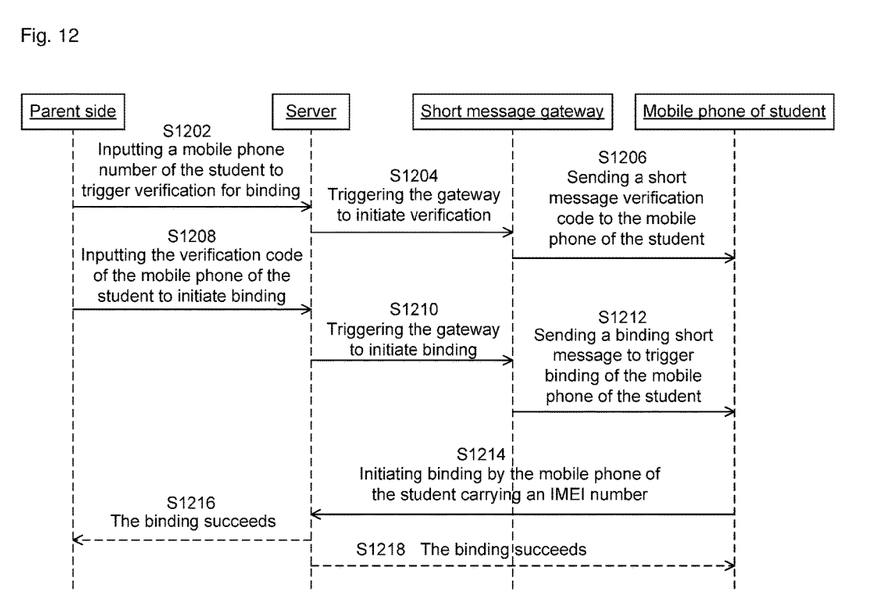
FIG. 12 is a typical flowchart of binding a mobile phone of a student to a parent according to a second embodiment of the disclosure.

FIG. 12 is a typical flowchart of binding a mobile phone of a student to a parent according to an embodiment of the disclosure. As shown in FIG. 12, a flow includes the following steps.

After a parent inputs a mobile phone number of a student, a server is triggered to initiate binding verification. The server forwards binding verification to a short message gateway. The short message gateway sends a short message random verification code to a mobile phone of the student.

After acquiring the random verification code (an effective duration of the random verification code is 5 minutes), the parent initiates a binding request to a server. The server forwards the binding request to the short message gateway. The short message gateway may send a binding short message to request the mobile phone of the student to initiate server binding.

Then, an AGT module of the mobile phone of the student may send an International Mobile Device Identity (IMEI) number of the mobile phone, a mobile phone number of the parent and the like to the server for registration and binding. After successful registration, the server may make a response to the mobile phone of the parent and make a response to the mobile phone of the student, indicating that binding succeeds.

Compared with a conventional art, the technical solutions of the embodiments of the disclosure have the following advantages.

1) The solution provides a set of model analysis algorithm to issue various scenario mode strategies, such as the in-class mode strategy, the break mode strategy and the after-class mode strategy, adaptively to main study and living scenarios of primary and secondary students.

2) The solution adopts the desktop control module to dynamically and pertinently implement various kinds of supervision and control, such as locking the mobile phone, limiting recreation time of a part of APPs and recording various Internet access behaviours, according to different scenario mode strategies.

3) The solution may record various behaviour habits of the student after implementation of the supervision strategy, so as to help the parent to dynamically regulate the strategy to form a supervision closed loop.

Each module may be implemented by a Central Processing Unit (CPU), Digital Signal Processor (DSP) or Field-Programmable Gate Array (FPGA).

Those skilled in the art should know that the embodiment of the disclosure may be provided as a method, a system or a computer program product. Therefore, the disclosure may adopt a form of pure hardware embodiment, pure software embodiment and combined software and hardware embodiment. Moreover, the disclosure may adopt a form of computer program product implemented on one or more computer-available storage media (including, but not limited to, a disk memory and an optical memory) including computer-available program codes.

The disclosure is described with reference to flowcharts and/or block diagrams of the method, device (system) and computer program product according to the embodiment of the disclosure. It should be understood that each flow and/or block in the flowcharts and/or the block diagrams and combinations of the flows and/or blocks in the flowcharts and/or the block diagrams may be implemented by computer program instructions. These computer program instructions may be provided for a universal computer, a dedicated computer, an embedded processor or a processor of other programmable data processing device to generate a machine, so that a device for realizing a function specified in one flow or more flows in the flowcharts and/or one block or more blocks in the block diagrams is generated by the instructions executed through the computer or the processor of the other programmable data processing device.

These computer program instructions may also be stored in a computer-readable memory capable of guiding the computer or the other programmable data processing device to work in a specific manner, so that a product including an instruction device may be generated by the instructions stored in the computer-readable memory, the instruction device realizing the function specified in one flow or many flows in the flowcharts and/or one block or many blocks in the block diagrams.

These computer program instructions may further be loaded onto the computer or the other programmable data processing device, so that a series of operating steps are executed on the computer or the other programmable data processing device to generate processing implemented by the computer, and steps for realizing the function specified in one flow or many flows in the flowcharts and/or one block or many blocks in the block diagrams are provided by the instructions executed on the computer or the other programmable data processing device.

The above are only the preferred embodiments of the disclosure and not intended to limit the scope of protection of the disclosure.

What is claimed is:

1. A terminal device control method, applied to a terminal device to be controlled, comprising:
    acquiring control strategies for the terminal device, and acquiring information on a current study scenario where the terminal device is located, wherein the current study scenario is calculated based on position information and course table information describing class conditions;
    acquiring control information for the terminal device, according to the control strategies for the terminal device and the information on the current study scenario;
    controlling the terminal device according to the control information;
    sending a request for regulating the control strategies;
    acquiring control strategy regulation information;
    acquiring new control information used in controlling the terminal device, according to the control strategy regulation information and the information on the current study scenario; and
    controlling the terminal device according to the new control information.

2. The method according to claim 1, further comprising:
    recording operating information of the terminal device; and
    sending the operating information to a preset master control terminal device in response to request information or regularly.

3. The method according to claim 1, further comprising:
binding the terminal device to be controlled to a master control terminal device.

4. The method according to claim 3, wherein the terminal device to be controlled is bound to the master control terminal device in any one of: a short message verification code manner, a two-dimensional code scanning manner or a manner that the terminal device to be controlled actively performs registration.

5. A terminal device control method, applied to a master control terminal device and comprising:
    acquiring configuration information related to a control scenario;
    determining control strategies according to the configuration information;
    sending the control strategies to a terminal device to be controlled; and
    sending control strategy regulation information in response to a request for regulating the control strategies;
    wherein the configuration information comprises position information and course table information describing class conditions;
    wherein a current study scenario where the terminal device to be controlled is located is calculated based on the position information and the course table information describing class conditions.

6. The method according to claim 5, wherein
the control strategies comprise one or more of: whether an Application (APP) is allowed to run on the terminal device to be controlled, a time period for which the APP is allowed to run on the terminal device to be controlled, whether a website is allowed to be accessed on the terminal device to be controlled or whether to lock a screen of the terminal device to be controlled.

7. The method according to claim 5, further comprising:
binding the terminal device to be controlled to the master control terminal device.

8. The method according to claim 7, wherein the terminal device to be controlled is bound to the master control terminal device in any one of: a short message verification code manner, a two-dimensional code scanning manner or a manner that the terminal device to be controlled actively performs registration.

9. A terminal device, which is a terminal device to be controlled, comprising:
    one or more processors; and
    a memory for storing instructions executable by the one or more processors,
    wherein the one or more processors are arranged to:
        acquire control strategies for the terminal device;
        acquire information on a current study scenario where the terminal device is located, wherein the current study scenario is calculated based on position information and course table information describing class conditions;
acquire control information for the terminal device, according to the control strategies for the terminal device and the information on the current study scenario;
control the terminal device according to the control information;
send a request for regulating the control strategies and acquire control strategy regulation information;
acquire new control information used in controlling the terminal device, according to the control strategy regulation information and the information on the current study scenario; and
control the terminal device according to the new control information.

10. The terminal device according to claim 9, wherein the one or more processors are further arranged to:
record operating information of the terminal device; and
send the operating information to a preset master control terminal device, in response to request information or regularly.

11. The terminal device according to claim 9, wherein the one or more processors are further arranged to:
perform binding processing to implement binding of the terminal device to be controlled to a master control terminal device.

12. A terminal device, which is a master control terminal device, comprising:
one or more processors; and
a memory for storing instructions executable by the one or more processors,
wherein the one or more processors are arranged to:
acquire configuration information related to a control scenario;
determine control strategies according to the configuration information;
send the control strategies to a terminal device to be controlled; and
send control strategy regulation information in response to a request for regulating the control strategies;
wherein the configuration information comprises position information and course table information describing class conditions;
wherein a current study scenario where the terminal device to be controlled is located is calculated based on the position information and the course table information describing class conditions.

13. The terminal device according to claim 12, wherein the one or more processors are further arranged to:
perform binding processing to implement binding of the terminal device to be controlled to the master control terminal device.

14. A system for controlling a terminal device, comprising: a terminal device to be controlled, a network-side device and a master control terminal device, wherein
the terminal device to be controlled is arranged to be controlled at least partially based on control strategies received from the master control terminal device;
the network-side device is arranged to implement communication between the terminal device to be controlled and the master control terminal device; and
the master control terminal device is arranged to send the control strategies to the terminal device to be controlled;
wherein the terminal device to be controlled is arranged to:
acquire from the master control terminal device the control strategies for the terminal device to be controlled;
acquire information on a current study scenario where the terminal device to be controlled is located, wherein the current study scenario is calculated based on position information and course table information describing class conditions;
acquire control information for the terminal device to be controlled, according to the control strategies for the terminal device to be controlled and the information on the current study scenario;
be controlled according to the control information;
send a request for regulating the control strategies and acquire control strategy regulation information;
acquire new control information for the terminal device to be controlled, according to the control strategy regulation information for the terminal device to be controlled and the information on the current study scenario; and
be controlled according to the new control information.

15. A non-transitory computer-readable storage medium having stored thereon computer-executable instructions for executing the method according to claim 1.

16. A non-transitory computer-readable storage medium having stored thereon computer-executable instructions for executing the method according to claim 5.

17. The system according to claim 14, wherein the master control terminal device is arranged to:
acquire configuration information related to a control scenario; and
determine the control strategies according to the configuration information.

* * * * *